June 1, 1937. J. A. ROCHÉ 2,081,957
DYNAMIC BALANCE OF CONTROL SURFACES
Filed Sept. 1, 1933 2 Sheets-Sheet 1
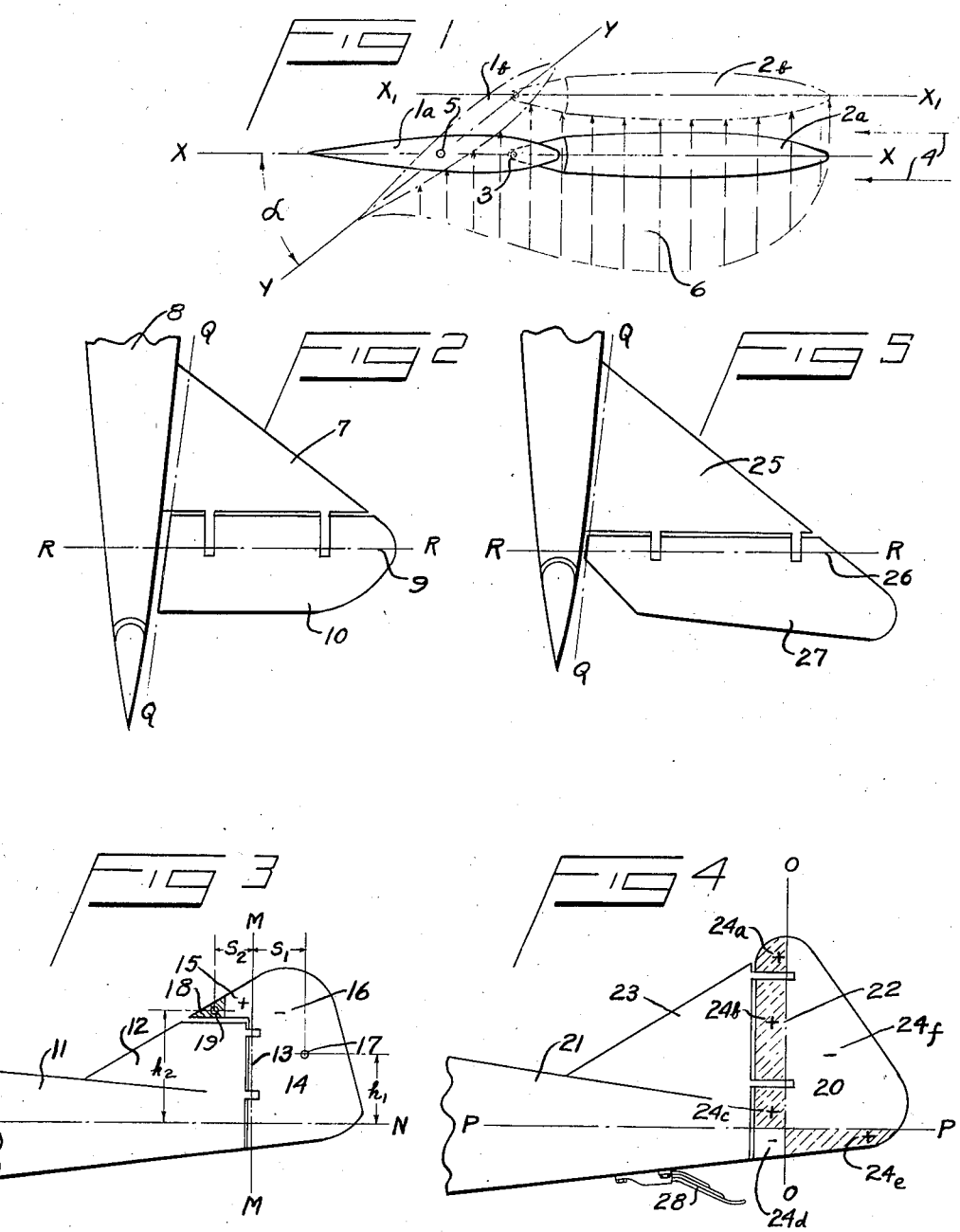
INVENTOR
JEAN A. ROCHÉ
BY Francis J. Vanderwerker
and Chade Koontz
ATTORNEYS June 1, 1937.  J. A. ROCHÉ  2,081,957
DYNAMIC BALANCE OF CONTROL SURFACES
Filed Sept. 1, 1933  2 Sheets-Sheet 2
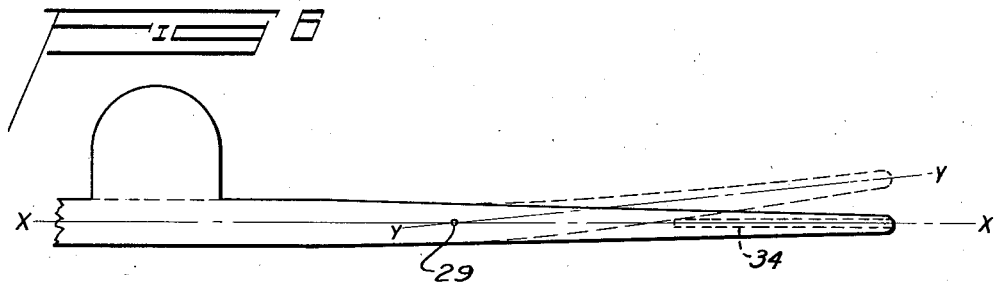
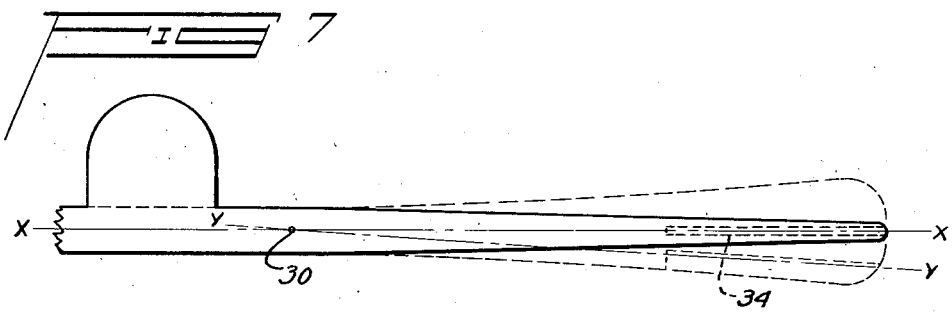
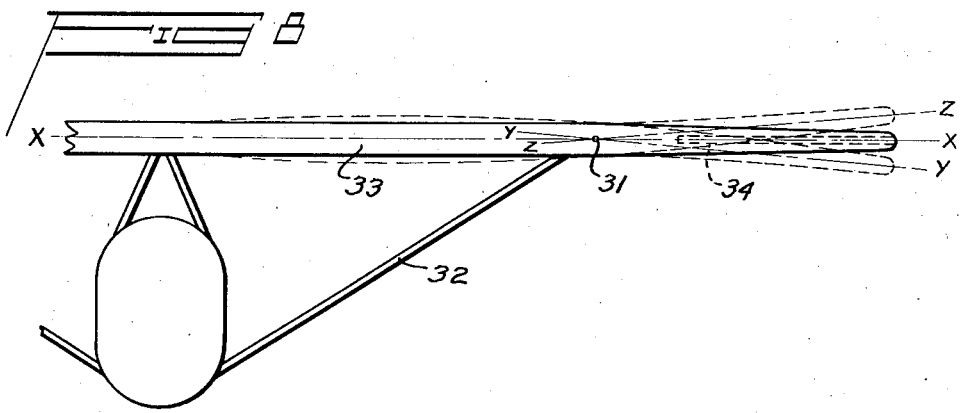
INVENTOR
JEAN A. ROCHÉ
BY
ATTORNEYS Patented June 1, 1937

2,081,957

UNITED STATES PATENT OFFICE 2,081,957

DYNAMIC BALANCE OF CONTROL SURFACES

Jean Alfred Roché, Dayton, Ohio

Application September 1, 1933, Serial No. 687,795

22 Claims. (Cl. 244—87)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to the elimination of fluttering associated with the control surfaces of aircraft and fast moving water-craft.

It is an object of my invention to so arrange the plan form of a control surface that the distance of the elements furthest removed from the axis of deflection of its supporting surface and from its immediate hinge axis will be minimized.

It is an other object of my invention to minimize the weight of all elements remotely located with respect to said axis of deflection and pivotation.

It is a further object of my invention to add certain masses to the structure of control surfaces in such a manner that the surfaces derive benefit therefrom.

With the foregoing and other objects in view, which will appear as the description proceeds, the invention consists in dynamic balance of control surfaces, which will be hereinafter more fully illustrated and described in the accompanying drawings and more particularly pointed out in the appended claims.

Referring to the drawings, in which numerals and letters of like character designate similar parts throughout the several views:

Fig. 1 illustrates lag incident to sudden translatory deflection of a control surface by its supporting surface;

Fig. 2 shows a plan form favorable to good dynamic balance;

Fig. 3 shows a statically balanced rudder;

Fig. 4 shows a dynamically balanced rudder;

Fig. 5 shows a plan form unfavorable to good dynamic balance;

Fig. 6 shows a cantilever wing subjected to bending;

Fig. 7 shows a cantilever wing subjected to torsion; and

Fig. 8 shows an externally braced wing subjected to bending.

In Fig. 1, a control surface 1 is pivotally attached to a supporting surface 2 by means of a hinge 3. The supporting surface 2 is fixed, longitudinally, with respect to an air-stream moving in the direction of the arrows 4. Under the influence of steady air flow, the surface 1, being aerodynamically balanced, maintains position 1a with respect to position 2a of the supporting surface 2; i. e., the center of mass 5 of the surface 1 is located upon the axis X—X common to the axes of symmetry of the aforementioned surfaces. Let it be assumed that the supporting surface 2 is suddenly deflected by air flow or other causes into a position 2b. Being free to pivot about the hinge 3 and having its center of mass well to the rear of the point of pivotation, the deflected surface 1 will assume the position 1b, due to inertia lag present in the center of mass 5. Thus it may be said that the portion of the control surface 1 lying to the rear of the hinge 3, has a negative balance sign; i. e., structure so located induces lag and should be made as light as possible, while that portion of the control surface lying forward of the hinge 3 has a positive balance sign and when weighted may be used to retard or eliminate lag. A lag angle alpha is momentarily created by the axis of symmetry Y—Y of the deflected surface 1, which when combined with position 2b of the deflected supporting surface 2, will induce a pressure distribution 6 upon the bottom surfaces thereof tending to deflect the axis of symmetry $X_1$—$X_1$ of the deflected surface 2 further away from the axis X—X.

Let it be assumed that the supporting surface 2 is in reality a stabilizer 7 fixedly attached to the rear of a fuselage 8, such as that shown in Fig. 2. Upon dissipation of the disturbing force, the supporting surface 2 will spring back through the position 2a to a position well below the axis X—X. Thereupon, a newly created pressure distribution, this time upon the top surface of the now downwardly deflected surfaces, will tend to carry the axis of symmetry of the supporting surface 2 a greater distance away from the axis X—X than that of its preceding location $X_1$—$X_1$. Repetition of increasing oscillation, such as that described above, results in destructive flutter.

Referring again to Fig. 2, it will be observed that the aforementioned oscillation may take place due to movement of the stabilizer 7 about a natural elastic axis, such as axis Q—Q. It will also be noted that the greater portion of the stabilizer 7 lies outboard of the axis Q—Q, with reference to the fuselage 8. An attempt may be made to so stiffen the structure of the stabilizer 7, that the hinge 9 of the elevator 10 is held substantially rigid with respect to the fuselage 8. Such construction, however, entails introduction of excessive weight. It also may be attempted to eliminate the lag referred to above by adding such weights as will bring the center of gravity of the control surface in its hinge line. It was discovered more than ten years ago, at the University of Amsterdam, Holland, that aileron flutter could be eliminated through employment of a system of static balance in which lead is placed in the aerodynamic balance portion of the aileron; i. e., that portion which extends forward of the line of hinge attachment of the aileron to its supporting wing.

Such additions of structural and balancing weight are unnecessary and may be insufficient to secure the desired elimination of angular lag of the control surface if the relation of the masses with respect to the two axes of motion has not been considered from the standpoint of dynamic balance.

Fig. 3 shows, in simplest form, application of this system of balance to the vertical control surfaces of an airplane. Let a fuselage 11 and a fin 12 rigidly attached thereto, be temporarily placed upon their sides in such a manner that the axis M—M of a hinge 13 is held in a horizontal position. Let a rudder 14 also be horizontally disposed and pivotally secured to the fuselage 11 and the fin 12 by means of the hinge 13. It will be noted that the rudder 14 is composed of a small forward panel 15 having a positive balance sign and an aft panel 16 extending above and below the axis of natural oscillation N—N of the fuselage 11 and having a negative balance sign with reference to lag about the axis M—M. Assuming the center of mass 17 of the latter panel to be of a three-pound magnitude, located at a two-foot distance $s_1$ aft of the axis M—M, and assuming the small size of the panel 15 limits the distance $s_2$ to one foot, static balance of the rudder 14 about its hinge 13 is satisfied when the product "$s_1$ (mass 17)" equals the product "$s_2$ (mass 19)"; i. e., when the mass 19 has a magnitude of six pounds.

Static balance proves sufficient as a means for eliminating lag in surfaces subjected purely to translatory deflections, as illustrated in Fig. 1. However, when a control surface is oscillated about two axes; i. e., the hinge axis of the control surface and the natural elastic axis of the support for said control surface, static balance will not prevent lag unless the distribution used to obtain static balance accidentally coincides with that required for obtaining dynamic balance. Dynamic balance of a control surface is effected when the products of inertia of that surface, with respect to the aforementioned axes, equal zero. In this latter system, dynamic balance of a control surface is practically effected when the products of inertia of that surface have a small value, is attained exactly when said products total zero, or is exceeded when said products reach a value having a sign opposite to the small value mentioned above. It will be understood that if these products result in either a small positive or negative value, practical dynamic balance is obtained.

To illustrate simply, let it be assumed that the center of mass 19, shown in Fig. 3, is relocated upon the axis N—N the same distance $s_2$ forward of axis M—M, by means of an arm extending within the fuselage 11 and fixedly attached to the panel 16. No change is thereby effected in the static balance of the rudder 14 about the axis M—M. It is well known to those skilled in the art that vertical surfaces such as those illustrated in Fig. 3, are constantly subject to suddenly applied side loads tending to twist them about the axis of natural oscillation of their supporting structures; i. e., about the natural axis N—N of the fuselage 11. Assuming the distance $h_1$ of the mass 17 above the axis N—N to be two-foot, the lag tendency of the panel 16 about the axis M—M may be briefly expressed as the mass 17 times the product of the distances $h_1$ and $s_1$; i. e., "mass 17 ($h_1 \times s_1$)" or three pounds times two-foot times two-foot equals twelve foot-pounds. Strictly speaking this value should be the integrated product of the component parts times their respective levers. Counteracting the aforementioned lag is the mass 19 times the product of the distance $h_2$ and $s_2$; i. e., six pounds times zero-foot times one-foot or six foot-pounds, which is obviously insufficient to establish dynamic balance of the rudder 14 about the axes M—M and N—N. Simple relocation of the mass 19 such that the distance $h_1$ and $h_2$ are equal will satisfy dynamic balance or assuming the distance $h_2$ shown in Fig. 3 to be three-foot, the magnitude of the mass 19 may be reduced to four pounds; i. e., four pounds times three-foot times one-foot or twelve foot-pounds, thereby effecting a two-pound weight saving in the rudder 14.

In Fig. 4, I have so apportioned the structural densities of the panels 24a through 24f, of the rudder 20, that oscillation of a fuselage 21 about its axis of natural oscillation P—P will not produce rotation of the rudder 20 about the axis O—O of its hinge 22. This system of dynamic balance may be accomplished by the method of computation, as referred to in part above, or by the method of experimentation.

In the first method, location of the axis P—P is established and a summation of the products of the weights of all of the small elements of the panels 24a through 24f, and their normal distances to the two axes P—P and O—O are summarized. It is well to note, at this point, that density increase in panels 24a through 24c located above axis P—P and in panel 24e located below axis P—P is favorable to dynamic balance and that these panels are regarded as having a positive balance sign, while the same density increase in panel 24d located below axis P—P and panel 24f located above axis P—P is unfavorable to dynamic balance and that the latter panels are regarded as having a negative balance sign. Adjustment of masses and necessary additions to the shaded "positive" portions of the rudder 20 are made until the required dynamic balance is obtained.

In the second method, the fuselage 21 is rigidly supported at the forward end. The rudder 20 is first brought to a condition approximating dynamic balance about the axis O—O by weight additions in the panels 24a through 24c forming the aerodynamically balanced portion of said rudder. A disturbing force is then applied normal to the upper surface of a fin 23, by a hammer blow or the use of a mechanical vibrator rigidly secured to said upper surface. As a result of this disturbing force, the fuselage 21 and fin 23 will oscillate about the axis P—P, which oscillation forthwith causes the rudder 20 to execute a series of secondary oscillations about the axis O—O. A number of weight additions are thereupon made to the panel 24e of the rudder 20 until re-application of the aforementioned disturbing forces to the fin 23 no longer produces rotation of the rudder 20 about the axis O—O.

It is worthy of note at this point, in connection with the first method enumerated hereinabove, that I have not only exactly calculated dynamic balance but have in addition been able to establish a criterion and a coefficient which will define the relative degree of dynamic balance for any control surface. This I have accomplished by dividing the products of inertia of the control surface by the product of its weight and area; i. e., $Pi/WxA$. The numerator of the fraction can be regarded as expressing the lag factor and consequent shaking power and the denominator of the fraction can be regarded as expressing the size of the surface. The value of the fraction truly expresses in non-dimensional units the degree of dynamic balance attained.

It is, of course, obvious that the principle of dynamic balance may be employed in connection with other vibration energy dampening means, such as spring dampeners or friction dampeners.

My invention finds equal application to all of the control surfaces of aircraft. Referring to Figs. 2 and 5, it will be noted that the stabilizers 7 and 25 yield about their natural axes of deflection Q—Q when subjected to forces normal to the top or bottom surfaces of their outwardly extending tips. The cantilever wings of Figs. 6 and 7 bend and twist, respectively, about their natural axes of deflection at points designated by numerals "29" and "30". The externally braced wing 33, of Fig. 8, bends about its natural axis of deflection at a point designated by numeral "31".

It is highly desirable that the plan form of control surfaces should be arranged such that elements remotely located from axes similar to the axes Q—Q and axes R—R of the hinges 9 and 26 be held to a minimum. For this reason the plan form shown in Fig. 2 is favorable to good dynamic balance, while the plan form of the elevator 27, shown in Fig. 5, is unfavorable to the same system of balance. The same consideration of plan form has been applied to the rudder 20, shown in Fig. 4. In applying my invention to the control surfaces of aircraft, it is essential that the following should be carefully borne in mind:

a. Elevators may be agitated by either a fuselage torsional oscillation, or stabilizers may be agitated by bending oscillation. In either case, location of the natural axis is not very different.

b. A rudder may be agitated by either a fuselage torsional oscillation, or a fin bending oscillation. In the latter case, the large portion of the rudder below the flexual axis assists dynamic balance.

c. In braced tail groups the fin and stabilizers are so well tied together that the only elastic oscillation which need be considered is that of the fuselage.

d. In the case of ailerons installed upon cantilever wings, the elastic axis is more difficult to locate. An estimate can be made of the effective axis in bending by taking the intersection of the deflected hinge line Y—Y of the aileron 34 with the undeflected hinge line X—X of the same surface, as shown in Fig. 6, and designated by the numeral "29", which approximates the instant center of aileron oscillation.

e. With respect to torsional oscillation of cantilever wings, the elastic axis of the wing is further inboard, as shown in Fig. 7, wherein the deflected hinge line Y—Y of the aileron 34 intersects the undeflected hinge line X—X of the same surface at intersection 30. However, torsional oscillation of metal wings is not so likely to occur as bending unless the skin is weakened by large and numerous apertures.

f. In the case of externally braced wings, as shown in Fig. 8, the bracing point may be assumed to be that about which the wing tip and ailerons will rotate. It will be noted that the upwardly deflected hinge line Z—Z of the aileron 34, the undeflected hinge line X—X of the same surface, and the downwardly deflected hinge line Y—Y thereof all intersect at the point of attachment 31 of the brace strut 32 to the externally braced wing 33.

g. Approximate dynamic balance is generally sufficient to eliminate flutter and is highly desirable from a weight savings standpoint.

h. The surface must not be overbalanced aerodynamically.

It is a further object of my invention to utilize those types of aircraft structure which in themselves largely assure dynamic balance. Referring to Fig. 4, box spar construction is applied to panels 24a through 24c, the panel 24f being composed of ribs of minimum light weight. Both mass and strength are required of panels 24e, due to an inherent shallowness characteristic of this panel and to the fact that it is further subject to the impact of foreign matter thrown back by the tail skid 28 in landing.

What I claim is:

1. The process of dynamically balancing an aircraft control surface adapted for movement about an axis of rotation for control and having its center of mass out of coincidence with and oscillatory about the elastic axis of its hinge support in flight which comprises the steps of oscillating said hinge support to determine the phase relation during oscillation of the control surface with respect to its axis and of thereafter distributing the masses of said control surface in such a manner that the products of inertia of said control surface with respect to said elastic axis and hinge axis of said surface substantially equal zero.

2. The process of dynamically balancing the structure of an aircraft rudder which comprises the steps of angularly deflecting the hinge line of said rudder by applying a force normal to the side profile of the fin immediately supporting said rudder hinge to determine the phase relation during oscillation of the rudder with respect to its hinge axis and of thereafter distributing the masses of said rudder in such a manner that the products of inertia of said rudder with respect to said natural elastic axis and the hinge axis of said rudder substantially equal zero.

3. The process of dynamically balancing the structure of an aircraft rudder having a panel forward and a panel rearward of its control axis and being statically balanced about said control axis which comprises the steps of angularly deflecting the hinge line of said rudder by applying a force normal to the side profile of the fin immediately supporting said rudder hinge to determine the phase relation during oscillation of the rudder with respect to its hinge axis and of thereafter distributing the masses of said panels such that their respective centers of gravity be on a line that is parallel to said elastic axis without affecting the aforesaid static balance.

4. In aircraft manufacture, the process of constructing a dynamically balanced control surface that is adapted for attachment to a supporting structure in such a manner as to be capable of oscillation with said structure about an elastic axis and being adapted for control movement about an axis disposed at an angle to said elastic axis, which comprises the steps of determining the approximate location of said elastic axis and of establishing a mass distribution of the components of said surface relative to said axes such that the product of inertia of said control surface with respect to said elastic axis and said control axis substantially equals zero.

5. In aircraft manufacture, the process of constructing a dynamically balanced multi-paneled control surface that is adapted for attachment to a supporting structure in such a manner as to be capable of oscillation with said structure about an elastic axis having a direction corresponding approximately to that of the longitudinal axis of said aircraft and adapted for movement about an axis of control disposed at an angle to said elastic axis, which comprises the steps of determining the approximate location of said elastic axis and of establishing a mass distribution of the components of said panels relative to said axes such that the sum of the products of inertia of said panels with respect to said elastic axis and said control axis substantially equals zero.

6. In an aircraft, a control surface supporting structure, including a hinge axis, a control surface statically unbalanced with respect to said axis adapted for movement about said axis and being capable of oscillation with said structure about an elastic axis that is disposed longitudinally with respect to said aircraft, said surface having its mass distributed with regard to said axes in such a manner that the product of inertia of said surface with respect to said axes substantially equals zero.

7. The process of preventing aerodynamic action on a statically unbalanced control surface of an aircraft in flight from increasing the magnitude of existing oscillations of said control surface about the elastic axis of its supporting structure, which consists in altering the mass distribution of said control surface with respect to the elastic axis of its supporting structure such that the product of inertia of said surface with respect to said elastic axis and said hinge axis substantially equals zero whereby a trailing portion of said surface during oscillation of its supporting structure will have a motion that is substantially in phase with its hinge axis.

8. The process of dynamically balancing an aircraft control surface adapted for movement about an axis of rotation for control and capable of oscillation about an elastic axis having a direction corresponding approximately to that of the longitudinal axis of said aircraft, which comprises the steps of determining the approximate location of the elastic axis of said hinge support and of thereafter establishing a mass relation of said control surface with respect to said axes in such a manner that the product of inertia of said control surface with respect to said elastic axis and hinge axis of said surface substantially equals zero.

9. The process of dynamically balancing an aircraft control surface arranged upon a support for movement about an axis of rotation for control and capable of oscillation with said support about an elastic axis having a direction corresponding approximately to that of the longitudinal axis of said aircraft, which comprises the steps of oscillating the hinge axis about said elastic axis to determine the extent of angular deflection of said surface about its hinge axis, and of altering the mass distribution of said surface relative to said axes such that the product of inertia of said control surface with respect to said elastic axis and said hinge axis substantially equals zero.

10. The process of dynamically balancing an aircraft control surface arranged upon a support for movement about an axis of rotation for control and capable of oscillation with said support about an elastic axis having a direction corresponding approximately to that of the longitudinal axis of said aircraft, which comprises the steps of oscillating the hinge axis about said elastic axis to determine the extent of angular deflection of said surface about its hinge axis, and of altering the mass distribution of said surface relative to said axes such that the product of inertia of said control surface with respect to said elastic axis and said hinge axis is positive in sign and greater than zero.

11. The process of dynamically balancing a multi-paneled aircraft control surface arranged upon a support for movement about an axis of rotation for control and capable of oscillation with said support about an elastic axis having a direction corresponding approximately to that of the longitudinal axis of said aircraft, which comprises the steps of actuating said support to cause the hinge axis of said surface to oscillate about said elastic axis to determine the extent of angular deflection of said surface about its hinge axis and of altering the mass relation of said panels relative to said elastic axes such that the sum of the products of inertia of said panels with respect to said elastic axis and hinge axis substantially equals zero.

12. In aircraft manufacture, the process of dynamically balancing an aircraft control surface adapted to be mounted for movement about one axis and capable of oscillation with said support about another axis having a direction corresponding approximately to that of the longitudinal axis of said aircraft, which comprises the steps of installing said surface upon said support for rotation about said first-mentioned axis, of actuating said support to cause the hinge axis of said surface to oscillate about said second-mentioned axis to determine the extent of angular deflection of said surface about said first-mentioned axis, and of altering the mass distribution of the components of said surface relative to said axes in such a manner as to substantially eliminate the presence of angular deflection of said surface about said hinge axis.

13. The process of dynamically balancing an aircraft control surface arranged upon a support for movement about an axis of rotation for control and capable of oscillation with said support about an elastic axis having a direction corresponding approximately to that of the longitudinal axis of said aircraft, which comprises the steps of statically balancing said surface about its hinge axis, of actuating said support to cause the hinge axis of said surface to oscillate about said elastic axis to determine the extent of angular deflection of said surface about its hinge axis, and of altering the mass distribution of said surface relative to said elastic axis without destroying said static balance such that the product of inertia of said surface with respect to said axes substantially equals zero.

14. The process of dynamically balancing an aircraft control surface arranged upon a support for movement about an axis of rotation for control with its center of mass substantially coincident therewith and capable of oscillation with said support about an elastic axis having a direction corresponding approximately to that of the longitudinal axis of said aircraft, which comprises the steps of actuating said support to cause the hinge axis of said surface to oscillate about said elastic axis to determine the extent of angular deflection of said surface about its hinge axis, and of altering the mass distribution of said surface relative to said elastic axis such that the product of inertia of said surface with respect to said axes substantially equals zero, while maintaining the center of mass coincident with said hinge axis.

15. The process of dynamically balancing a multi-paneled aircraft control surface arranged upon a support for movement about an axis of rotation for control and capable of oscillation with said support about an elastic axis of said aircraft and with portions of said panels extending inboard and outboard of said elastic axis, which comprises the steps of applying a force to said support to cause the hinge axis of said surface to oscillate about said elastic axis to determine the extent of angular deflection of said surface about its hinge axis and of altering the mass relation of one or more of the different portions of said panels with respect to said elastic axis such that the sum of the products of inertia of said panels with respect to said elastic axis and hinge axis substantially equals zero.

16. An aircraft control surface adapted to be mounted upon a supporting structure for control movement about a hinge axis said surface being statically unbalanced with respect to said hinge axis and being capable of oscillation with said structure about an elastic axis of said structure, said surface having its mass distributed with respect to said axes in such a manner that the product of inertia of said surface with respect to said axes substantially equals zero.

17. A multi-paneled control surface adapted to be mounted upon a supporting structure for control movement about a hinge axis and being capable of oscillation with said structure about an elastic axis, said panels respectively being statically unbalanced with respect to said hinge axis and having their masses distributed with respect to said axes in such a manner that the sum of the products of inertia of said panels with respect to said axes substantially equals zero.

18. A multi-paneled control surface adapted to be mounted upon a supporting structure for control movement about a hinge axis and being capable of oscillation with said structure about an elastic axis that is disposed longitudinally with respect to said aircraft, said panels respectively being statically unbalanced with respect to said hinge axis and having their masses distributed with respect to said axes in such a manner that the sum of the products of inertia of said panels with respect to said axes are greater than zero.

19. The process of dynamically overbalancing an aircraft control surface adapted for movement about an axis of rotation for control and having its center of mass out of coincidence with and oscillatory about the elastic axis of its hinge support in flight which comprises the steps of angularly deflecting said hinge support by applying a force to determine the character of motion of said control surface with respect to the motion of the supporting structure and of thereafter establishing a mass relation of said control surface in such a manner that the trailing portion of said control surface will lead the motion of the hinge axis while obtaining a control surface total mass that is less than the total mass required for static balance or static overbalance of said surface.

20. In an aircraft, a control surface supporting structure including a hinge axis, a control surface adapted for movement about said axis and being capable of oscillation with said structure about an elastic axis of said supporting structure, said surface having a mass distribution with regard to said axes, such that the trailing portion of said control surface will lead the motion of its axis of pivotation during oscillation and having a total weight that is greater than the minimum weight required for dynamic balance and less than the minimum total weight required for static balance.

21. The process of minimizing the magnitude of existing oscillations of a pivoted control surface about the elastic axis of its supporting structure which consists in arranging the masses in relation to the hinge axis and the elastic axis such that the products of inertia, with respect to said axes, of the portion of said control surface forward of said pivot axis is greater than that of the portion rearward of said hinge axis while obtaining a total mass for said control surface that is less than the total mass required for static balance or static overbalance of said surface.

22. The process of minimizing the magnitude of existing oscillations of a statically unbalanced pivoted control surface about the elastic axis of its supporting structure which consists in arranging the masses in relation to the hinge axis and the elastic axis such that the products of inertia, with respect to said axes, of the portion of said control surface forward of said pivot axis is greater than that of the portion rearward of said hinge axis while obtaining a total mass for said control surface that is less than the total mass required for static balance or static overbalance of said surface.

JEAN A. ROCHÉ.